INVENTORS
STANLEY J. DYKE
MARCEL L. TARTAVEL

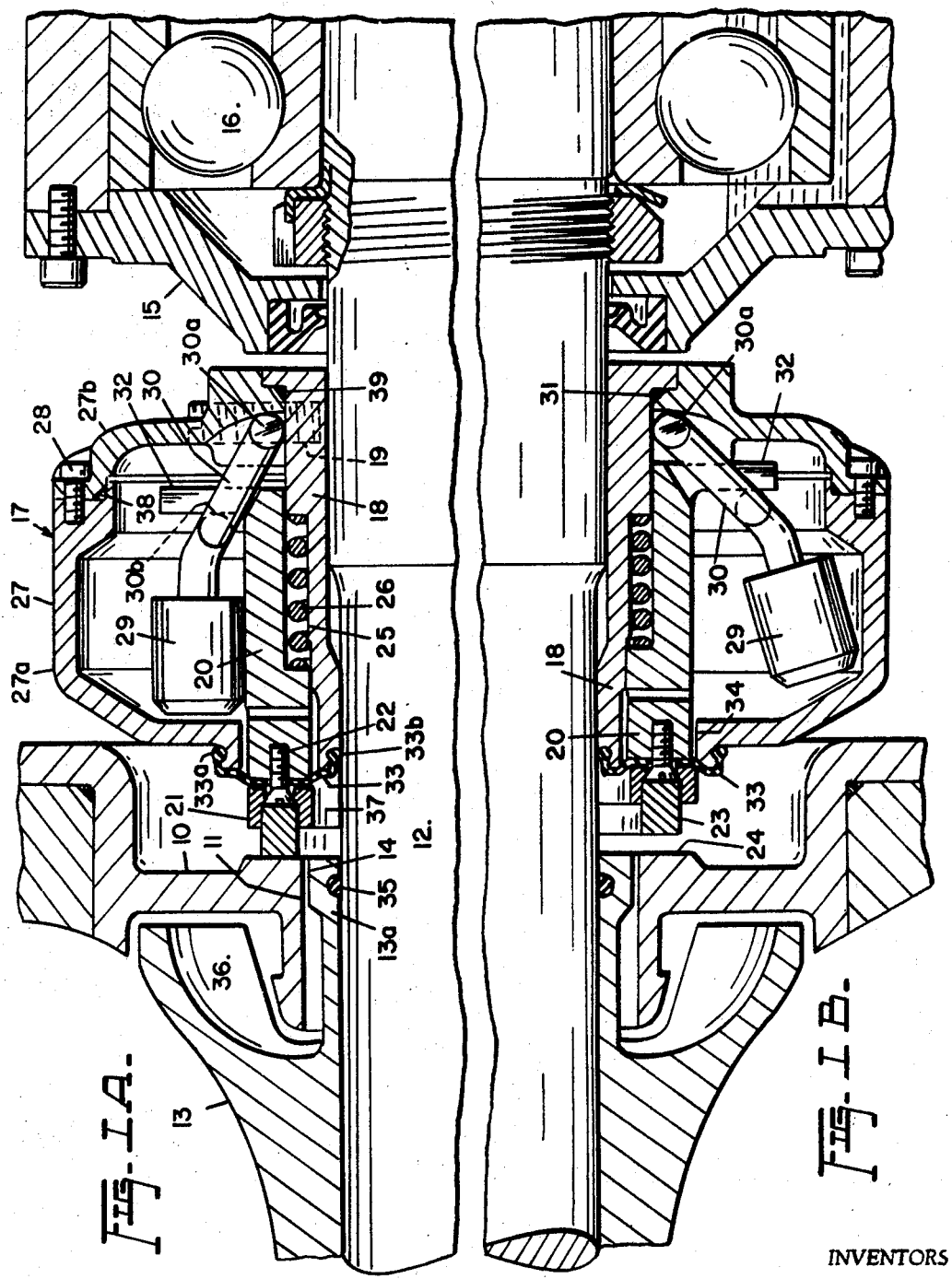

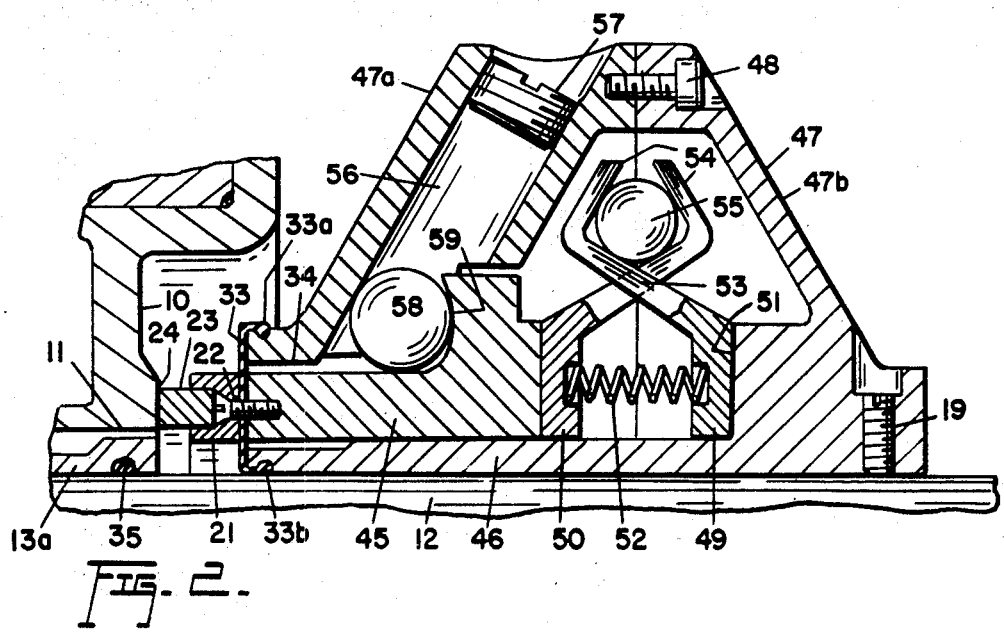
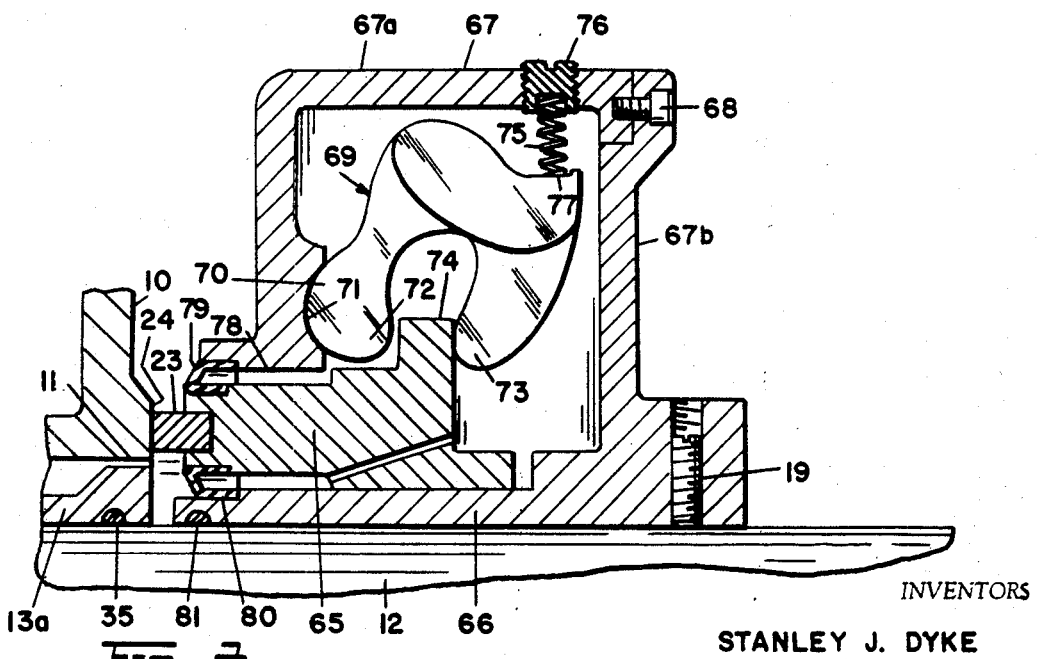

BY Featherstonhaugh & Co.
ATTORNEY

United States Patent Office 3,472,169
Patented Oct. 14, 1969

3,472,169
BALANCED SEAL FOR CENTRIFUGAL PUMPS
Stanley J. Dyke, Pierrefonds, Quebec, and Marcel L. Tartavel, Montreal, Quebec, Canada, assignors to Canadian Vickers Limited, Montreal, Quebec, Canada
Filed Dec. 27, 1967, Ser. No. 693,936
Int. Cl. F04d 29/12; F16j 15/42
U.S. Cl. 103—111                                   8 Claims

ABSTRACT OF THE DISCLOSURE

A pump casing having an impeller shaft extending through an opening with an annular space existing between the shaft and the casing. A centrifugally actuated seal closes off the annular space when the pump is stopped and opens the space to the atmosphere when the pump is running. The seal actuating mechanism includes a sleeve fixed to the shaft and a collar slidable on the sleeve, with a spring between the sleeve and collar to bias the seal to its closed position. Movable weights carried by the sleeve respond to centrifugal force for sliding the collar against the spring action to the open position of the seal. In some embodiments the sleeve is surrounded by a housing which fully encloses the seal actuating mechanism.

---

This invention relates to new and useful improvements in centrifugal pumps and more particularly the invention concerns itself with an improved shaft seal assembly for heavy duty slurry pumps where the presence of abrasive particles in the slurry makes it impractical to utilize conventional shaft seal or packing in constant sealing engagement with the shaft, inasmuch as such seals or packing quickly deteriorate under the abrasive action of the slurry being pumped.

It has been found that this disadvantage of conventional seals and packing can be overcome by the provision of a movable seal which closes off an annular space between the pump casing and the impeller shaft when the pump is stopped, but which automatically opens that space to the atmosphere when the pump is running, in which event leakage through the space normally does not occur because of substantially balanced pressure inside and outside of the pump casing and the open seal is not subjected to the abrasive action of the slurry. Such movable seals are commonly actuated by a mechanism responsive to centrifugal force during rotation of the shaft, so that opening and closing of the seal takes place automatically.

The principal object of the invention is to structurally and functionally improve upon centrifugally actuated movable seal of the type above outlined, particularly from the standpoint of properly enclosing the seal actuating mechanism in a housing which in itself is sealed against ingress of slurry and other foreign matter so that the enclosed mechanism is safeguarded from possible damage.

Also, another important object of the invention is to porvide a seal assembly including an annular seal member which, in some embodiments of the invention, is supported by the actuating mechanism itself but which, in another embodiment, is supported by the impeller shaft and is deflectable by the actuating mechanism between it open and closed positions, all the embodiments affording a more positive and effective sealing action than has heretofore been possible.

Another important object of the invention is to provide a variety of centrifugal force responsive seal actuating mechanisms which are highly efficient in operation, easy to service, and not likely to easily get out of order.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1A is a fragmentary longitudinal sectional view showing a portion of the pump casing, impeller shaft and seal assembly of the invention in its closed position;

FIG. 1B is a view similar to that in FIG. 1 but showing the seal assembly in its open position;

FIG. 2 is a fragmentary longitudinal sectional view of a modified embodiment of the invention;

FIG. 3 is a fragmentary longitudinal sectional view of another modified embodiment;

Figure 4:
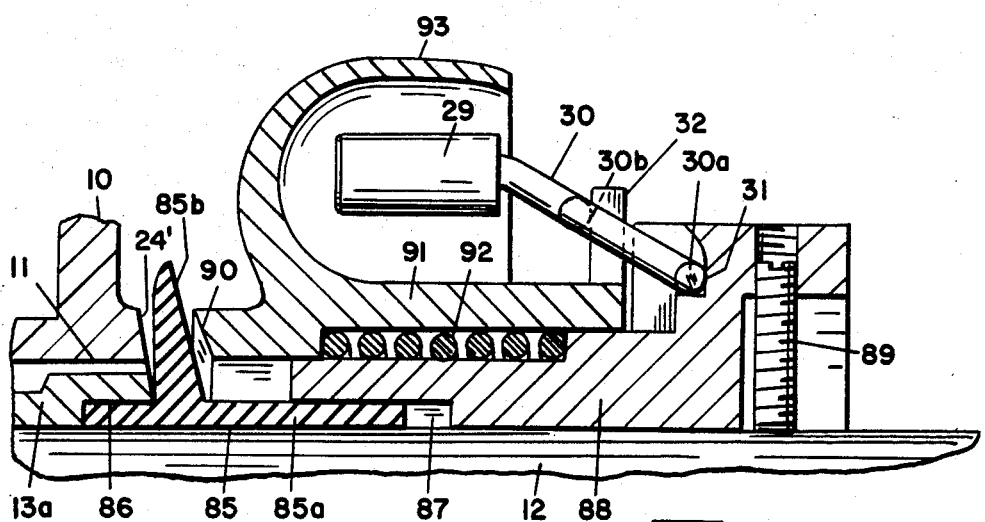
FIG. 4 is a fragmentary longitudinal sectional view of another modified embodiment.

Referring now to the accompanying drawings in detail, more particularly to FIG. 1, the numeral 10 designates a casing wall of a heavy duty centrifugal pump such as may be used for pumping slurry or other material containing abrasive and/or corrosive particles, the casing wall 10 being formed with an opening 11 through which extends a rotatable shaft 12 carrying the usual impeller 13 at the inside of the casing. It will be noted that the diameter of the shaft 12 is smaller than that of the opening 11 so as to accommodate the impelled hub 13 with an annular space 14 existing between the hub and the casing wall 10, as shown. The outer end of the shaft 12 projecting from the pump casing extends into a housing 15 wherein it is journalled in suitable bearings 16 in accordance with conventional practice.

The seal assembly of the invention is designated generally by the reference numeral 17 and is positioned on the shaft 12 between the pump casing 10 and the housing 15. The assembly 17 comprises a sleeve 18 which is fixed to the shaft 12 for rotation therewith, as by a suitable set screw 19, or the like, and a collar 20 is slidably positioned on the sleeve 18. The end of the collar 20 facing the casing wall 10 has a grooved ring 21 secured thereto, as by suitable screws 22, the grooved ring serving as mounting for an annular seal member 23. The portion of the casing wall 10 surounding the opening 11 is formed with an annular sealing seat 24 with which the seal member 23 is engaged when the collar 20 is slid on the sleeve 18 in the direction of the sealing seat. The sleeve 18 is recessed as at 25 to accommodate a compression spring 26 which reacts between the sleeve and the collar 20 so as to bias the seal member 23 against the seat 24, as will be apparent.

An annular housing 27 surounds and is rotatable with the sleeve 18, the housing preferably consisting of two complemental sections 27a, 27b separably secured together by suitable screws 28 so that access to the interior of the housing may be had. The housing 27 encloses the sleeve 18 and the collar 20 as well as centrifugal force actuated mechanism consisting of a plurality of weights 29 secured to the free end of arms 30, these arms having laterally angulated inner end portions 30a which are seated in sockets 31 provided in the housing section 27b and thus serve as fulcrums for swinging movement of the arms 30 and associated weights 29 in a plane parallel to the axis of the shaft 12, that is, between an inwardly swung position as shown in FIG. 1A and an outwardly swung position shown in FIG. 1B. The arms 30 also have laterally angulated intermediate portions 30b which slidably engage outwardly projecitng lugs 32 on the collar 20 so that when the shaft 12 is rotating and the weighted arms 30 swing outwardly under centrifugal force, the collar 20 is slid against the action of the spring 26 from the position shown in FIG. 1A to that in FIG. 1B, thus causing the seal member 23 to be drawn away from the sealing seat 24 and opening the annular space 14 to the atmosphere. Of course, when rotation of the shaft 12 stops, the weighted arms 30 return to their initial position shown in FIG. 1A and the spring 26 slides the collar 20 to bring the seal member 23 into engagement with the seat 24, thus closing off the space 14.

The housing 17 itself is sealed against access of slurry or other foreign matter to the seal actuating mechanism in both the closed and open positions of the seal member 23. This sealing is effected by the provision of an annular seal or ring 33 of flexible material such as rubber, for example, which is secured to the end of the collar 20 which carries the ring 21 and is held in place by the ring and the screws 22. The portion of the housing section 27a surrounding the collar 20 is recessed as at 34 to slidably accommodate the end portion of the collar which carries the ring 21 and seal member 23, as shown. The sealing ring 33 bridges the recess 34 from the housing section 27a to the collar 20 and from the collar to the sleeve 18, so that ingress of foreign matter through the recess 34 into the housing 27 is prevented. The outer marginal edge of the sealing ring 33 is provided with an annular bead 33a which is seated in an annular groove at the exterior of the housing section 27a, while the inner marginal edge of the ring 33 is similarly provided with an extension or bead 33b which frictionally engages the shaft 12 and thereby prevents flow of fluid between the sleeve 18 and the shaft.

The impeller hub 13a contains an O-ring 35 in sealing engagement with the shaft 12, as shown.

When the pump is stopped, as illustrated in FIG. 1A, the pumped slurry or other fluid under the action of the discharge static head fills the intake region of the pump casing including the region 36 behind the impeller 13 and the annular space 11 and it also fills the cavity 37 defined by the seal member 23, the ring 21, the inner portion of the sealing ring 33 and the shaft 12. However, the fluid is prevented from entering the housing 27 by the seal member or ring 33 which bridges the recess 34, and is also prevented from flowing between the sleeve 18 and the shaft 12 by the bead 33b of the ring 33. The spring 26 provides sufficient pressure to hold the seal member 23 in intimate sealing contact with the seat 24 against the pressure of fluid acting on the ring 21 and ring 33. In this stopped condition of the pump the weights 29 lies flat against the collar 20, where they are held by engagement of the arm portions 30b with the lugs 32 on the collar.

When the pump is running, the weights 29 move outwardly by centrifugal force as shown in FIG. 1B and as the arm portions 30b slide outwardly along the lugs 32, the collar 20 is slid along the sleeve 18 against the action of the spring 26 to disengage the seal member 23 from the seat 24. Thus, the cavity 37 previously formed by the seal member 23 to close off the annular space 11 is now opened to the atmosphere, but ordinarily no fluid will escape inasmuch as with the pump running, the reduction of static pressure in the region 36 behind the impeller 13 and in the annular space 11 is such that the pressure in the now open cavity 37 is substantially atmospheric.

However, if the resultant of the impeller action and the static head of the pumped fluid is such that a negative pressure is created in the open cavity 37, there will be a flow of air from the atmosphere past the open seal member 23 and through the annular space 11 toward the impeller. On the other hand, if the resultant is such that a positive pressure remains in the open cavity 37, or in the event that any back-up occurs while the pump is starting or stopping, the pumped medium will flow outwardly through the annular space 11 past the open seal member 23 to a drain.

The seal actuating mechanism is, of course, protected against contact with the pumped medium by being enclosed in the housing 27, as already described. A suitable sealing ring 38 is provided at the junction of the housing sections 27a, 27b, and another sealing ring 39 is provided to seal the housing section 27b against the sleeve 18, as illustrated.

Reference is now drawn to a modified embodiment of the invention shown in FIG. 2 wherein the arrangement of the seal member 23, supporting ring 21 and sealing ring 33 is the same as already described in connection with FIGS. 1A and 1B, these components being mounted on the collar 45 which is slidable on the sleeve 46 fixed to the shaft 12 by the set screw 19, or the like. In this embodiment the mechanism housing 47 also is in two complemental sections 47a, 47b, the latter of which may be formed integrally with the sleeve 45 while the section 47a is separably secured to the section 47b by suitable screws 48.

The centrifugally actuated mechanism includes a pair of reaction members 49, 50 positioned on the sleeve 46, the member 49 being held against sliding away from the member 50 by an abutment 51 on the sleeve, while the member 50 is freely slidable toward and away from the member 49, being resiliently biased away from the member 49 by a compression spring 52 interposed between the two members. The intermediate portions of the two members cross each other as indicated at 53 and the outer end portions 54 of the two members are mutually convergent in the outward direction, having a suitable weight 55 interposed therebetween. It will be noted that when the mechanism is rotating, outward movement of the weight 55 under centrifugal force will spread apart the end portions 54, thus drawing the base portion of the member 50 toward the member 49 against the action of the spring 52.

The housing portion or section 47a is provided with a cylindrical chamber 56 which is elongated in a plane parallel to the axis of the shaft 12 and is slanted in the direction of the members 49, 50 as shown. The chamber 56, which is closed at its outer end by a removable plug 57, contains a spherical weight 58 engageable with a curved abutment face 59 on the collar 45. An interlocking action exists between the weights 55 and 58 in that when the pump is at rest as shown in FIG. 2, the spring 52 reacting between the abutment members 49, 50, holds the weight 55 captive in the position shown, regardless of the rotary position of the shaft 12 and housing 47. Also, the spring 52 acts through the medium of the member 50 on the collar 45, which not only holds the seal member 23 in its closed position, but also holds the weight 58 captive in the lower end portion of the chamber 56 by engagement of the collar face 59 with the weight.

However, when the shaft 12 is rotated during operation of the pump, the weight 55 moves outwardly under centrifugal force as already explained, but full effect of centrifugal force is not effective until the weight 55 moves outwardly to an extent sufficient to compress the spring 52 so that the weight 58 is released, whereupon outward movement of the weight 58 in the chamber 56 will cause the weight 58 to bear against the collar face 59 and thereby assist in further compression of the spring 52.

Of course, as the collar 45 is slid in the direction of the member 49, the seal member 23 will be disengaged from the seat 24, but when rotation stops, the weights 55 and 58 will return to their initial positions while the spring 52 slides the collar 45 in the opposite direction to again engage the seal member 23 with the seat 24.

Again, the mechanism is fully protected by being enclosed in the housing 47, the recess 34 of which is bridged by the sealing ring 33. It may be also noted that while the centrifugally acting mechanism in FIGS. 1A and 1B operates with a leverage provided by the arms 30, the mechanism of FIG. 2 does not employ a leverage action, but rather, inclined planes provided by the convergent member portions 54 and the wall of the slanting chamber 56. If desired, the reaction member 49 may be positively secured to the sleeve 46 and the member 50 may be positively secured to the collar 45.

Another modified embodiment of the invention is shown in FIG. 3 wherein the centrifugal mechanism operates with a leverage action provided by cams. In this embodiment the seal member 23 is mounted on the collar 65 which is slidable on the sleeve 66 fixed to the shaft 12 by the set screw 19, or the like. The sleeve 66 carries a housing 67 consisting of two complemental sections 67a, 67b, the latter of which may be integral with the sleeve while the section 67a is separably secured to the section 67b by suitable screws 68.

The centrifugally actuated mechanism includes combined weight and cam means 69 disposed within the housing, the means 69 having a fulcrum portion 70 engaging a seat 71 in the housing section 67a. The means 69 also has finger-like or cam-like members 72, 73 at opposite sides of a flange 74 provided on the collar 65, and a compression spring 75 reacts between a removable plug 76 in the housing section 67a and a spring seat 77 provided on the means 69, substantially as shown.

When the pump is stationary, the spring 75 pressing against the seat 77 on the weight and cam means 69 causes the member 73 of the means 69 to urge the collar 65 so as to maintain the seal member 23 in engagement with the seat 24. However, when the mechanism is rotating, the weight and cam means 69 will swing outwardly about the fulcrum portion 70, and while the spring 75 becomes compressed, the member 72 of the means 69 will slide the collar 65 in the opposite direction so as to disengage the seal member 23 from the seat 24.

The centrifugal mechanism and the collar 65 are protectively enclosed in the housing 67, the collar 65 projecting into a recess 78 in the housing section 67a in order to carry the seal member 23. However, that recess is bridged by a pair of flexible sealing rings 79, 80, so that ingress of foreign matter into the housing is prevented. The ring 79 bridges the recess 78 between the housing section 67a and the collar 65, while the member or ring 80 bridges the recess between the collar 65 and the shaft sleeve 66. Both the rings 79, 80 are of a substantially U-shaped cross-section and their flexible character facilitates sliding of the collar 65 along the sleeve 66, as will be readily understood.

Flow of fluid between the shaft 12 and the sleeve 66 is prevented by a suitable sealing ring 81 mounted within the sleeve, it being noted that in this embodiment the three sealing rings 79, 80 and 81 perform the combined function of the sealing ring 33 in the embodiments of FIGS. 1A, 1B and 2. Also, use of the two rings 79, 80 in the embodiment of FIG. 3 leaves the end of the collar 65 exposed for mounting of the seal member 23 directly thereon, and use of a mounting ring such as the aforementioned ring 21 is not necessary.

Figure 5:
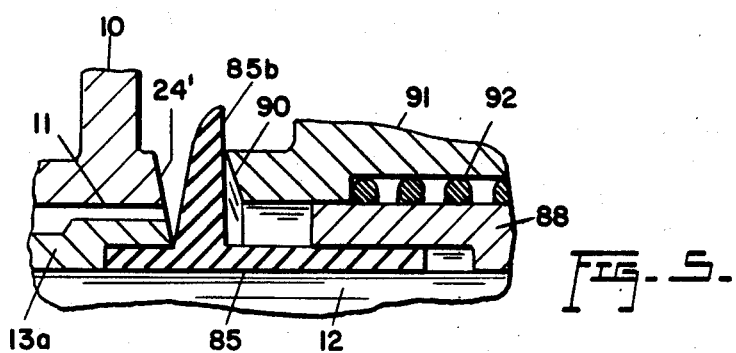
FIG. 5 is a fragmentary sectional detail showing the embodiment of FIG. 4 in its open position.
Figure 6:
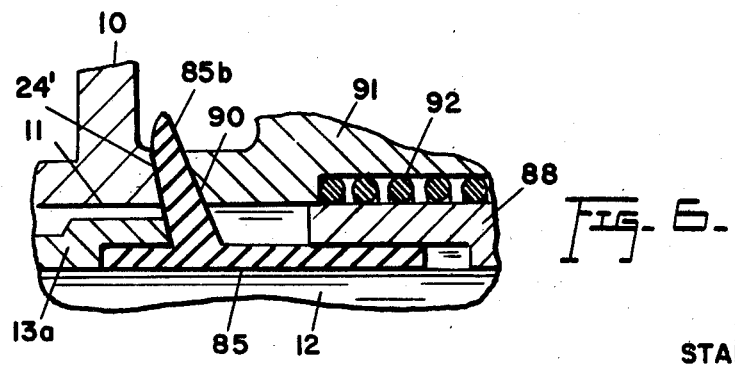
FIG. 6 is a fragmentary sectional detail of the embodiment of FIG. 4 in its fully closed position.

In all the embodiments of the invention thus far described the seal member 23 is supported by the sliding collar of the actuating mechanism, but another modified embodiment shown in FIGS. 4–6 utilizes a seal member 85 which is mounted directly on the shaft 12. The member 85 is formed from suitable resiliently flexible, deformable material such as rubber, for example, and includes a tubular body 85a which encircles the shaft and is formed integrally with an outwardly projecting annular flange 85b, and being tapered in the outward direction substantially as shown.

One end portion of the seal body 85a is seated in an annular recess 86 formed inside the impeller hub 13a, while the other end portion thereof extends into a similar recess 87 formed in the sleeve 88 which is secured to the shaft 12 as by a set screw 89. Thus, the seal body 85a prevents leakage of fluid both between the shaft 12 and the impeller hub 13a, and between the shaft and the sleeve 88.

The flange 85b of the seal member 85 is interposed between the annular seat 24' on the casing wall 10 and the adjacent end 90 of a collar 91 which is slidable on the sleeve 88, a compression spring 92 reacting between the collar and the sleeve, as will be apparent. The centrifugal force responsive mechanism including the components 29, 30, 31 and 32 is of the type already described and is mounted on the sleeve 88, the weights 29 thereof being at least partially enclosed and protected by an annular shield 93 formed integrally with the collar 91.

FIG. 6 shows the seal in its fully closed position, wherein the collar 91 has been slid in the direction of the casing wall 10 by the spring 92 and the seal flange 85 has been pressed by the collar end 90 against the seat 24'. This action is facilitated by the resilient deformability of the seal which permits the flange 85b to bend in the region of its connection to the seal body 85a, and it is to be noted that the seat 24' and the sleeve end 90 are slanted in a manner complemental to the taper of the flange 85b so as to assure a full radial line contact between these parts when the seal is in its fully closed position as in FIG. 6.

As the shaft 12 is rotated and centrifugal action of the weights 29 causes the collar 91 to move away from the closed seal, the inherent resiliency of the seal causes the flange 85b to assume its normal, relaxed or undeformed position shown in FIG. 4, this being the position which the flange normally has in the absence of a deflecting force being exerted thereon. In that position the seal has become half open (see FIG. 4), but as rotation of the shaft 12 continues and the collar 91 is slid still further away to the fully open position of the seal illustrated in FIG. 5, centrifugal force will also act on the seal flange 85b itself, causing it to become substantially perpendicular to the body 85a and also causing it to come in contact with the end 90 of the collar 91, as shown. In this position the annular space 11 will be fully open, but flow of fluid inside the collar 91 will be prevented by contact of the flange 85b with the collar end 90.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a centrifugal pump, the combination of a pump casing having a wall formed with a shaft receiving opening, a rotatable impeller shaft extending through said opening with an annular space existing between the casing wall and said shaft, and a centrifugally actuated seal assembly for closing off and opening said annular space when the pump is stopped and running respectively, said seal assembly comprising a sleeve fixed to and rotatable with said shaft exteriorly of the casing, a collar axially slidable on said sleeve, said casing wall having an annular sealing seat surrounding said annular space, an annular seal member mounted on the end of said collar facing said sealing seat and engageable with the sealing seat when the collar is slid toward said casing wall, resilient means reacting between said sleeve and said collar for biasing the collar toward the casing wall, centrifugal force responsive means carried by and rotatable with said sleeve and operatively engaging said collar for sliding the latter away from the casing wall against the action of said resilient means when said shaft is rotated, a housing connected to and rotatable with said sleeve, said housing completely enclosing said centrifugal force responsive means and said collar with a portion of the housing facing said sealing seat being formed with an annular recess slidably accommodating the seal member equipped end of the collar, and annular seal means distinct from said annular seal member, said annular seal means bridging said recess from said housing to said collar and from the collar to said sleeve for preventing leakage of fluid through said recess into said housing.

2. In a centrifugal pump, the combination of a pump casing having a wall formed with a shaft receiving opening, a rotatable impeller shaft extending through said opening with an annular space existing between the casing wall and said shaft, and a centrifugally actuated seal assembly for closing off and opening said annular space when the pump is stopped and running respectively, said seal assembly comprising a sleeve fixed to and rotatable with said shaft exteriorly of the casing, a collar axially slidable on said sleeve, said casing wall having an annular sealing seat surrounding said annular space, an annular seal member mounted on said shaft and including a deflectable flange projecting outwardly between said sealing seat and the end of the collar facing said seat so that the seal member engages the sealing seat when the collar is slid toward said casing wall, resilient means reacting between said sleeve and said collar for biasing the collar toward the casing wall, and centrifugal force responsive means carried by and rotatable with said sleeve and operatively engaging said collar for sliding the latter away from the casing wall against the action of said resilient means when said shaft is rotated, said annular seal member also including a tubular body positioned on said shaft and having said flange provided thereon, an end portion of said tubular body extending into said sleeve and constituting means for sealing the sleeve against the shaft.

3. The device as defined in claim 2 wherein said deflectable flange is engaged by said sealing seat and by said end of said collar to close off said annular space as well as the interior of the collar when the latter is slid toward said casing wall, and wherein said flange is engaged by said end of the collar only to close off the interior of the collar when the latter is slid away from the casing wall.

4. The device as defined in claim 1 wherein said annular seal means include an extension in engagement with said shaft, said extension constituting means for sealing sleeve against the shaft.

5. The device as defined in claim 1 wherein said centrifugal force responsive means comprise arms fulcrumed on said sleeve for swinging movement in a plane parallel to the sleeve axis, and weights carried by said arms, said arms operatively engaging said collar.

6. The device as defined in claim 1 wherein said centrifugal force responsive means comprise a pair of juxtaposed reaction members positioned on said sleeve, one of said reaction members being fixed with respect to the sleeve and the other reaction member being movable toward and away from the fixed reaction member and being in abutment with said collar, said reaction members having crossed intermediate portions and outwardly convergent end portions, and weight means interposed between the outwardly convergent end portions of said reaction members whereby the movable member may be drawn toward the fixed member by outward movement of said weight means under centrifugal force.

7. The device as defined in claim 6 wherein a portion of said housing adjacent the collar is provided with a chamber elongated in a plane parallel to the sleeve axis and slanted outwardly in the direction of said reaction members, an abutment face provided on said collar, and a weight movably positioned in said chamber in operative engagement with said abutment face of the collar, said abutment face holding said weight captive against outward movement in said chamber under centrifugal force until said weight means between said reaction members has centrifugally moved sufficiently outwardly to permit centrifugal movement of said weight in said chamber and thereby assist in drawing the movable reaction member toward the fixed member.

8. The device as defined in claim 1 wherein said centrifugal force responsive means comprise combined weight and cam means having a fulcrum in said housing and including a pair of spaced apart cam members, and a flange provided on said collar and disposed between said cam members whereby to effect sliding of the collar on said sleeve by movement of the weight and can means about said fulcrum.

References Cited
UNITED STATES PATENTS

| 2,272,454 | 2/1942 | Wilfley. | |
| 2,660,487 | 11/1953 | Wilfley | 277—25 |
| 2,620,207 | 12/1952 | Wilfley | 277—25 |

HENRY F. RADUAZO, Primary Examiner

U.S. Cl. X.R.

277—25